(12) United States Patent
Kudoh

(10) Patent No.: US 6,400,854 B1
(45) Date of Patent: Jun. 4, 2002

(54) IMAGE FORMING APPARATUS AND METHOD FOR REDUCING ORIGINAL DOCUMENT CONVEYING SPEED WHEN FORMING A REDUCED IMAGE

(75) Inventor: Kunio Kudoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/329,342

(22) Filed: Jun. 10, 1999

(30) Foreign Application Priority Data

Jun. 12, 1998 (JP) ............................................ 10-165001

(51) Int. Cl.[7] ................................................ G06K 9/20

(52) U.S. Cl. ........................ 382/317; 382/312; 382/318; 382/319

(58) Field of Search ................................ 382/317, 318, 382/319, 312; 358/412, 404, 444

(56) References Cited

U.S. PATENT DOCUMENTS

| | | | | |
|---|---|---|---|---|
| 5,168,359 A | * | 12/1992 | Mills .......................... | 358/140 |
| 5,365,270 A | * | 11/1994 | Guichard et al. ........... | 348/311 |
| 5,642,200 A | * | 6/1997 | Kurihara et al. ............ | 358/296 |
| 6,160,636 A | * | 12/2000 | Nagano et al. ............. | 358/412 |

FOREIGN PATENT DOCUMENTS

| | | | | |
|---|---|---|---|---|
| JP | 11308441 | * | 11/1999 | .......... H04N/1/393 |

* cited by examiner

*Primary Examiner*—Jerome Grant, II
*Assistant Examiner*—Anh Hong Do
(74) *Attorney, Agent, or Firm*—Oblon, Spivak, McClelland, Maier & Neustadt, P.C.

(57) ABSTRACT

An image forming apparatus includes an original document conveying device to convey an original document at a predetermined conveying speed according to a magnification ratio. An original document reading device reads image information of the original document with a one-dimensional image sensor, and an information omission device omits information of the image information of the original document read by the original document reading device. An image forming device forms an image according to the image information read by the original document reading device synchronized with conveying of the original document by the original document conveying device. An original document protect mode designating device designates an original document protect mode, and an original document protect mode processing device reduces the predetermined original document conveying speed of the original document conveying device by 1/n and causes the information omission device to omit information of every (n-1) number of lines of the image information read by the original document reading device in a sub-scanning direction when the original document protect mode is designated by the original document protect mode designating device.

18 Claims, 6 Drawing Sheets

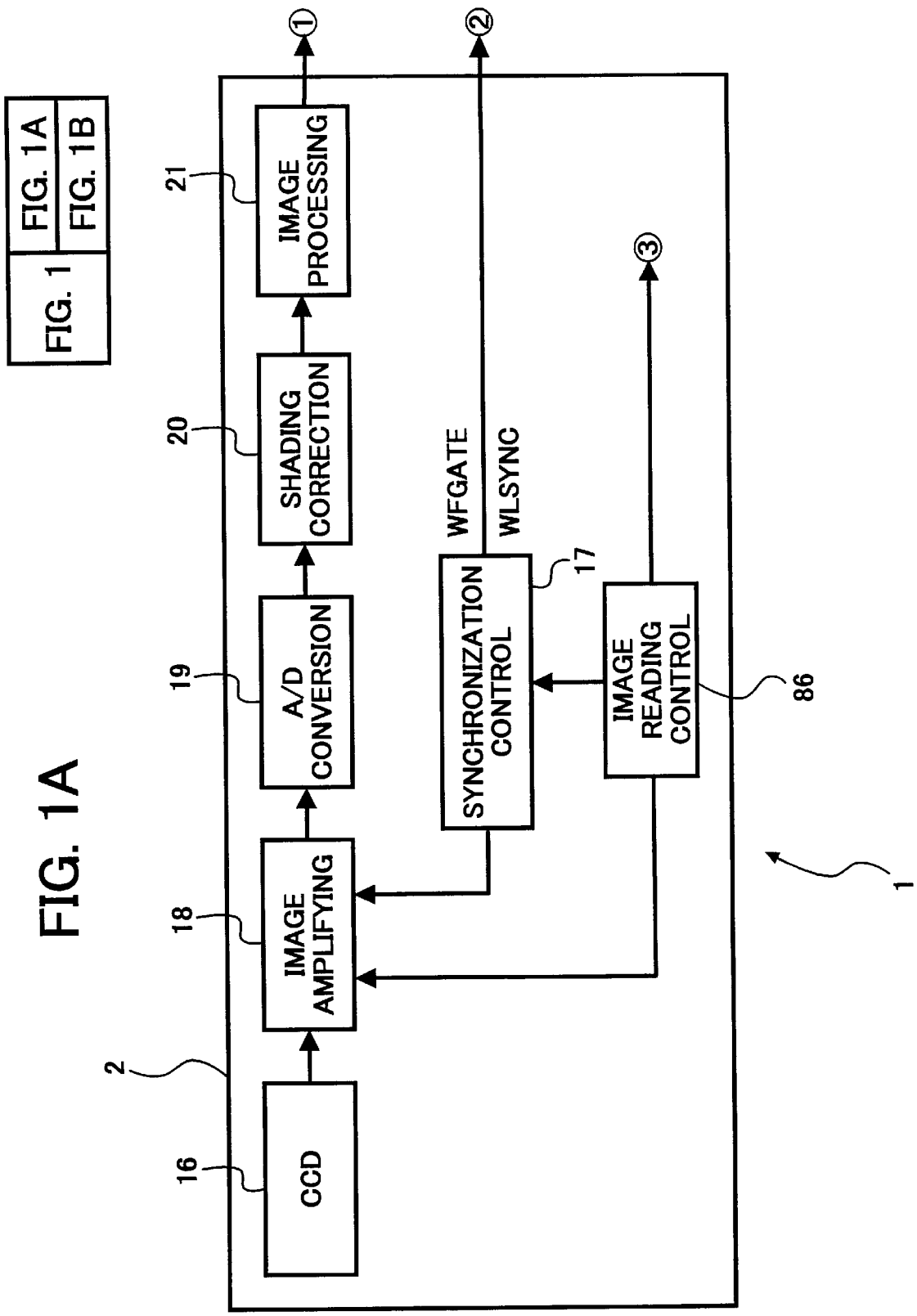

IMAGE FORMING APPARATUS AND METHOD FOR REDUCING ORIGINAL DOCUMENT CONVEYING SPEED WHEN FORMING A REDUCED IMAGE

FIELD OF THE INVENTION

The present invention relates to digital image forming apparatuses, such as digital copying machines for copying a large or long original document, in which an image of the original document is formed by reading the image with a one-dimensional image sensor such as a CCD and writing the image on a surface of a photoconductor with or without applying various image processes to the image.

DISCUSSION OF THE BACKGROUND

Generally, in copying machines, for forming an image of an original document at a desired magnification ratio by enlargement or reduction, the driving speed of a photoconductor is kept constant and the driving speed of a scanner scanning the original document for reading the image of the original document is made inversely proportional to the magnification ratio. Copying machines for office use are generally provided with a scanner having a flat contact glass so that a book can be placed on the flat contact glass for copying. An original document is placed on the contact glass with a surface carrying an image for reading facing down, and the image is read by a one-dimensional image sensor by moving an exposure optical system, which includes a lamp, a mirror, and so forth and is provided beneath the contact glass, in a sub-scanning direction by a driving system, such as a wire pulley or the like, such that the surface carrying the image is exposed with light emitted from the lamp. The emitted light is passed through a slit and the light reflected by the surface carrying the image is received by the image sensor. Therefore, when an image is enlarged or reduced, the moving speed of the exposure optical system is changed according to the magnification ratio.

On the other hand, in a case of copying machines for large size original documents, such as A1 or A0 size documents and so forth, it is unrealistic to use a contact glass capable of receiving the whole portion of a large size original document from the view points of the size and cost of the machines. In addition, large size original documents are mostly sheets, such as drawings, and a demand for copying large size books is small. Therefore, generally, the copying machines for large size original documents include a fixed exposure optical system and are configured such that an original document is conveyed by conveying rollers so as to be read by the fixed exposure optical system. This configuration also has an advantage in that a long sheet original document can be copied. When enlarging or reducing an image in this configuration, the original document conveying speed is changed according to the magnification ratio.

In copying machines for large size documents in which an original document is conveyed as described above, when the copying speed is not fast, it rarely occurs that the original document is damaged or torn when being conveyed, and measures for protecting the original document from being damaged are not particularly required. However, demand for increasing the copying speed has risen in recent years, and besides, the magnification ratio for reducing an image has increased, for example, to 25% from 75% or 50%, which used to be a generally available magnification ratio, which consequently causes the original document conveying speed to be further increased.

Generally, in digital copying machines, enlargement and reduction of an image in the main scanning direction is accomplished by electrical processes of interpolation and omission of image information of one line of the image information which is read by a scanner and stored in a line memory. For the sub-scanning direction, however, because costs would be greatly increased if a frame memory including line memories for storing a number of lines of image information was used for accomplishing electrical enlargement or reduction, a so-called mechanical enlargement and reduction method in which the reading speed of a scanning device is made inversely proportional to the magnification ratio is widely used. When changing the driving speed of a scanner to one inversely proportional to the magnification ratio, for example according to Japanese patent laid-open publication No. 5-63905, the driving speed of a driving motor is slowly increased such that the driving speed of the scanner does not greatly overshoot a target driving speed.

In a case of copying machines for office use, even if the driving speed of a scanner is increased, because the driving system of the scanner is contained in a body of the machine and the original document is not conveyed, protection of the original document and measures for protecting an operator are not necessary. On the other hand, in a case of copying machines for large size documents, in which the original document is conveyed for reading, often a part of the original document conveying system is exposed. When the original document conveying speed is fast, there exists a danger that an original document of thin paper may be damaged or torn or a finger of an operator inserting the original document in the copying machine may be caught by the original document conveying system. Accordingly, it is not desirable to increase the original document conveying speed too greatly. For preventing an original document from being damaged, a known method limits the original conveying speed to a certain level by switching the enlargement and reduction process from the mechanical one to an electrical one when a desired magnification ratio for reduction exceeds a predetermined magnification ratio.

However, when the electrical enlargement and reduction method is used for the sub-scanning direction in a copying machine using a method of conveying an original document for reading, an operation of forming an image of a long original document synchronized with the movement of the long original document becomes impossible, which is possible with the mechanical enlargement and reduction method. More specifically, when the original document is long and when feeding of a transfer sheet at a printer is started at the same time that the original document is inserted into a scanner and image information of the original document read by the scanner is started to be stored in a frame memory, if the read image information overflows the capacity of the frame memory, the operation of forming an image is interrupted and terminated.

When the size of an original document is a standard size, such as A1 or A2, because the length of the original document is known, it is possible to start feeding of a transfer sheet at a printer after reading image information of the original document to an appropriate portion of the document and to store the read information in an image memory so that the image forming operation will not be terminated in the course of the image forming operation due to overflowing of the read image information from the image memory. However, in a case of a long original document and when the length is unknown, even when feeding of a transfer sheet is started after reading of the original document is completed up to the maximum capacity of the image memory, if the remaining image information of the original document exceeds the capacity of the memory, the image forming operation has to be terminated in the course of the image forming operation.

SUMMARY OF THE INVENTION

The present invention has been made in view of the above-discussed and other problems and addresses and resolves the above-described and other problems.

Preferred embodiments of the present invention provide a novel digital image forming apparatus and method which is capable of suppressing an original document conveying speed even when the magnification ratio for reduction is large and for forming an image of a long original document synchronized with conveying of the original document.

According to a preferred embodiment of the present invention, a novel image forming apparatus includes an original document conveying device to convey an original document at a predetermined conveying speed according to a magnification ratio. An original document reading device exposes the original document conveyed by the original document conveying device and reads image information of the original document with a one-dimensional image sensor, and an information omission device omits information of the image information of the original document read by the original document reading device. An image forming device forms an image according to the image information read by the original document reading device synchronized with conveying of the original document by the original document conveying device. An original document protect mode designating device designates an original document protect mode, and an original document protect mode processing device reduces the predetermined original document conveying speed of the original document conveying device by 1/n and causes the information omission device to omit information of every (n−1) number of lines of the image information read by the original document reading device in a sub-scanning direction when the original document protect mode is designated by the original document protect mode designating device.

Accordingly, in the image forming apparatus of the present invention, when forming an image of a long original document reduced at a certain magnification ratio, for example, by designating the original protect mode with the original protect mode designating device, the original conveying speed of the original document reading device according to the magnification ratio is reduced, for example by half, and at the same time image information of the original document read by the original document reading device is omitted for every other line. As a result, an image reduced with the desired magnification ratio is formed without damaging the original document and synchronized with conveying of the original document.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1B:
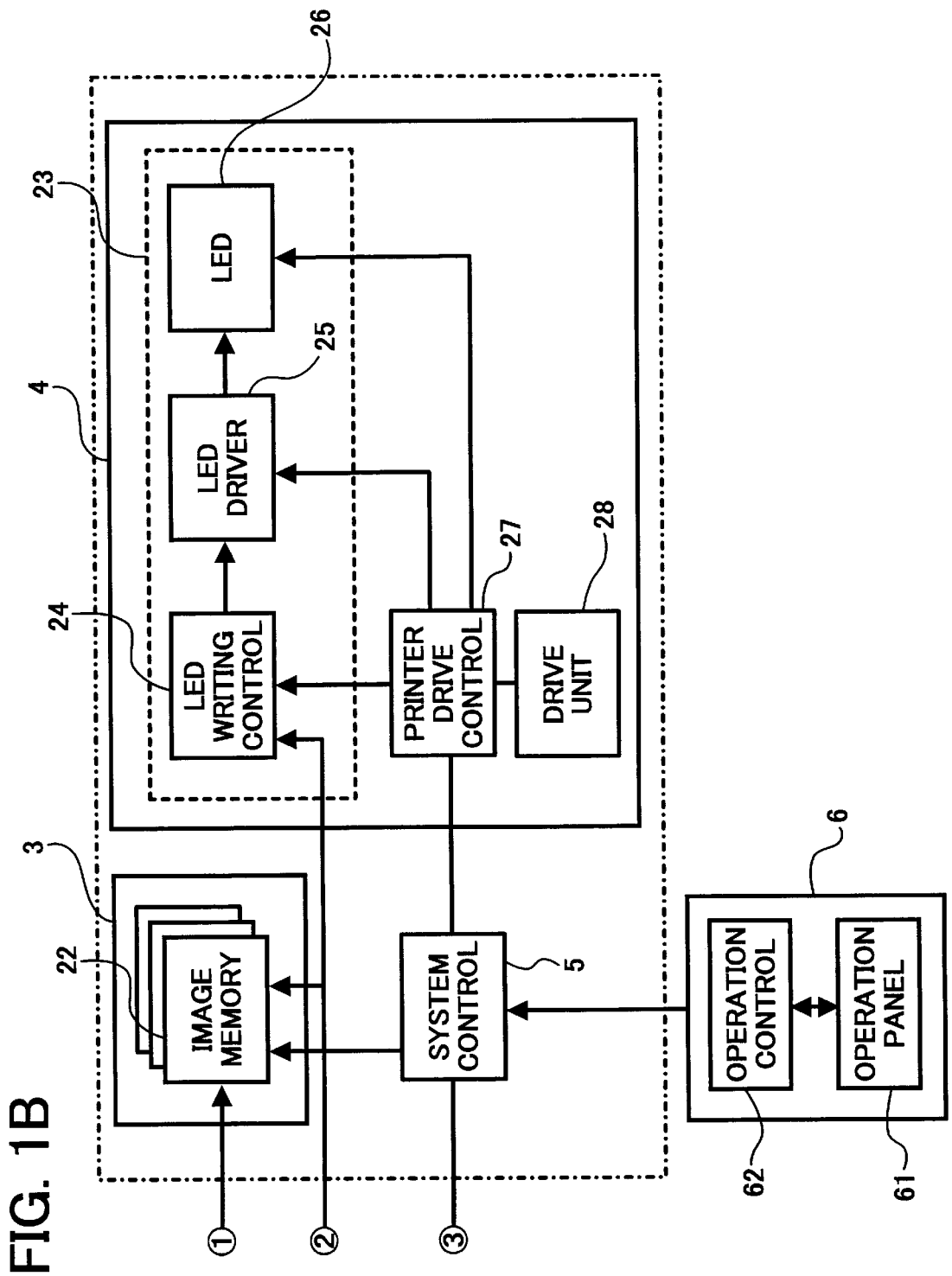
FIG. 1 is a functional block diagram illustrating an exemplary structure of a digital image forming apparatus according to an embodiment of the present invention.

Referring now to the drawings, wherein like reference numerals designate identical or corresponding parts throughout the several views, preferred embodiments of the present invention applied to a digital copier for a wide document, for example an A1 or A2 size document, as an example of an image forming apparatus, are now described.

FIG. 1 is a functional block diagram illustrating an exemplary structure of a digital copier 1 to which the present invention can be applied. An original document reading device 2 reads an image of an original document. An image information storage device 3 stores image information of the original document which is read by the original document reading device 2 in an image memory 22. An image forming device 4 performs a series of image forming operations to form an image on a transfer sheet according to the image information of the original document stored in the image information storage device 3. A system control device 5 controls the series of image forming operations. An operational device 6 inputs various operational instructions to the system control device 5 through, e.g., manipulation of keys, which are provided on an operational panel 61, by an operator.

Figure 2:
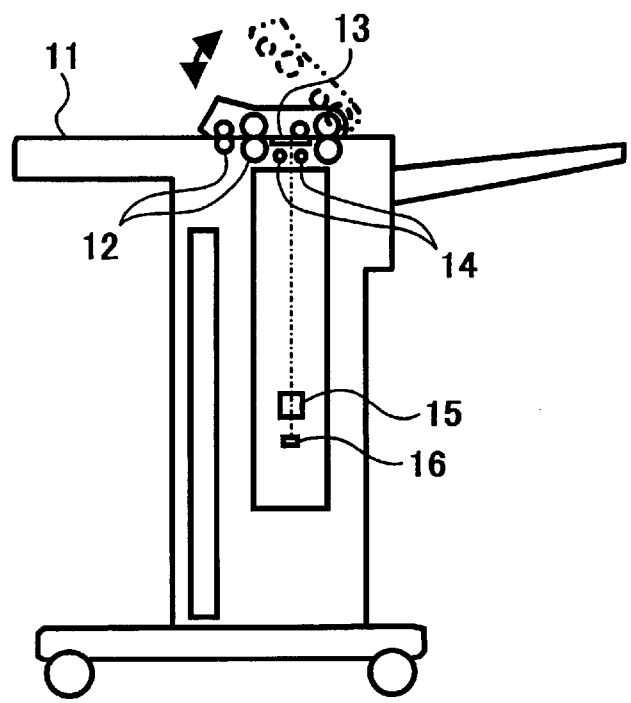
FIG. 2 is a schematic side view illustrating an exemplary structure of an original document reading device.

FIG. 2 is a schematic side view illustrating an exemplary structure of the original document reading device 2. Referring to FIG. 1 and FIG. 2, the structure and the operation of the original document reading device 2 are described. An original document (not shown) is inserted by an operator into an insertion inlet of an original document plate 11 with the surface carrying an image facing down. The original document is then conveyed over a surface of a contact glass 13 by rotation of rollers 12. When the original document is conveyed over the contact glass 13 and is passed through a slit, the original document is exposed by light emitted by a pair of fluorescent lamps 14, and a reflection light from the original document is imaged via an imaging lens 15 onto a CCD (charge-coupled-device) 16 as a one-dimensional image sensor.

The light of the original document image thus imaged onto the CCD 16 is converted to an electrical signal and is output as an analog signal. The analog signal is output from the CCD 16 to an image amplifying circuit 18 synchronized with a clock signal output from a synchronization control circuit 17. The analog signal amplified by the image amplifying circuit 18 is converted to a multi-value digital image signal for each picture element by an A/D conversion circuit 19. A shading correction circuit 20 then corrects distortion of the image signal in the main scanning direction, which is caused by variation of the light intensity of the fluorescent lamps 14, stain of the contact glass 13, variation of the sensitivity of each element of the CCD 16, and so forth. The corrected digital image signal is converted to digital image information for writing the image information by an image processing circuit 21, and is then output to the image information storage device 3 to be stored in the image memory 22. The image signal stored in the image memory 22 is read to be output to the image forming circuit 23 of the image forming device 4. The image signal is converted to a driving signal to drive an LED head 26 to emit infrared rays via an LED writing control circuit 24 and an LED driver circuit 25. A drive unit 28 is connected to a printer drive control 27, which in turn is connected to each of the LED writing control circuit 24, LED driver circuit 25, and LED head 26 to provide control signals thereto from the system control 5.

Figure 3:
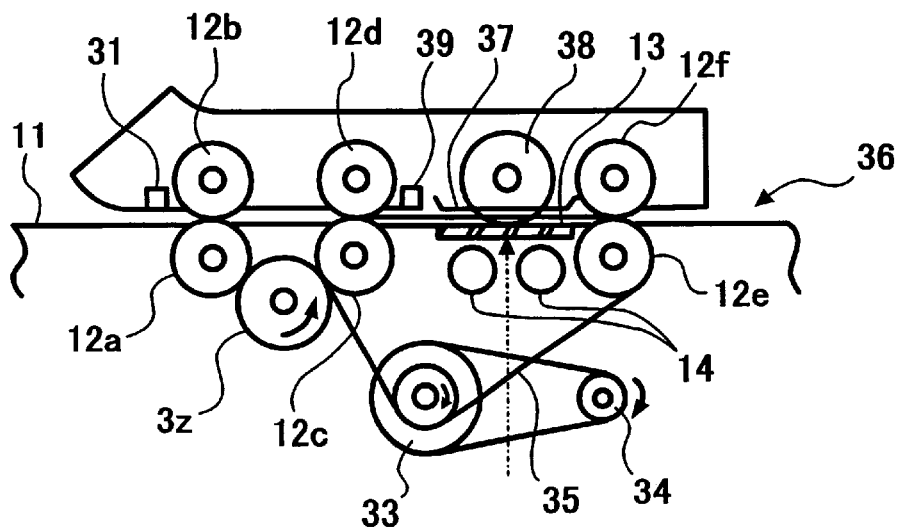
FIG. 3 is a schematic side view illustrating an original document conveying device of the original document reading device.

FIG. 3 is a schematic side view illustrating an original document conveying device 36 of the original document reading device 2. When an original document is inserted into the 1-5 insertion inlet of the original document plate 11 and is detected by an original document insertion sensor 31, conveying rollers 12a–12f start to rotate at a rotation speed according to a designated magnification ratio. The conveying rollers 12a, 12c, 12e are driving rollers and the conveying rollers 12b, 12d, 12f are driven rollers. A gear 32 transmits a driving force from the conveying roller 12c to the conveying roller 12a. A pulley 33 transmits a driving force from a driving motor 34 to the conveying rollers 12c and 12e via a belt 35. A guide plate 37 guides the original document toward the surface of the contact glass 13 and a back-up roller 38 presses the original document so that the original document tightly contacts the surface of the contact glass 13. A registration sensor 39 detects a leading edge of the original document such that reading of the original document starts at an appropriate timing.

Figure 4:
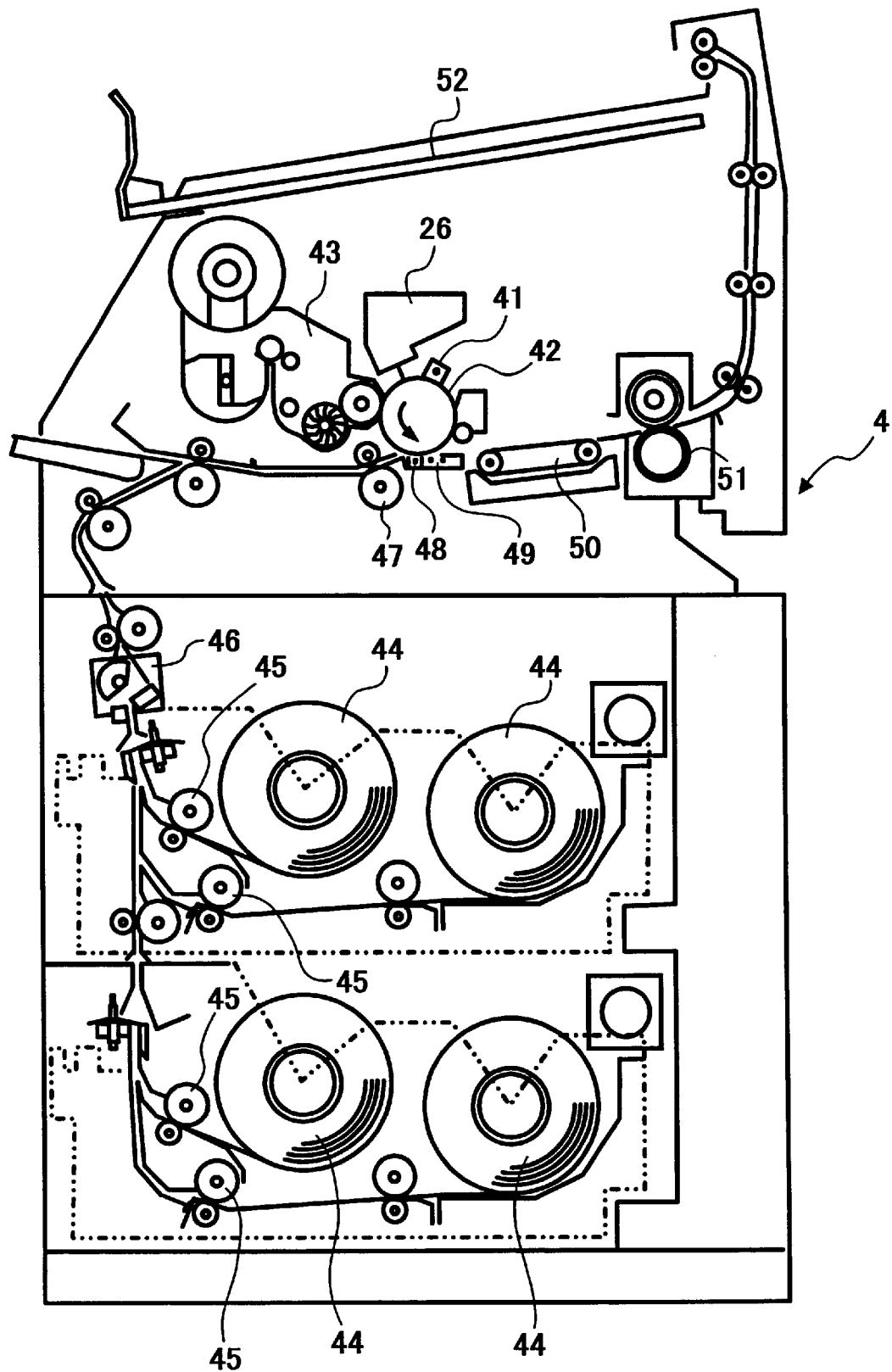
FIG. 4 is a schematic side view illustrating an exemplary structure of the image forming device.

FIG. 4 is a schematic side view illustrating an exemplary structure of the image forming device 4. A charging device 41 including, for example, a scorotron charger uniformly charges the surface of a photoconductor drum 42 at, e.g., −850V. The uniformly charged surface of the photoconductor drum 42 is irradiated with a visible or infrared beam light emitted by the LED head 26 such that image information is written on the photoconductor drum 42. The LED head 26 may include a number of LED elements and selfoc lenses arranged in an array in a manner corresponding to each other. When the photoconductor drum 42 is irradiated with an LED light according to image information, the surface charge of the photoconductor drum 42 flows to ground. The LED head 26 is made not to emit light for a part of the image information having thin density, i.e., a part where the binary signal is at a non-recording level, and to emit light for a part of the image information having thick density, i.e., a part where the binary signal is at a recording level. Thus, the surface charge of a part of the photoconductive drum 42 where LED light is not irradiated becomes, e.g., −850V and the surface charge of a part of the photoconductor drum 42 where LED light is irradiated becomes about, e.g., −100V, and thereby a latent image is formed according to the density of an image. The latent image is then developed by a developing unit 43. Because the toner inside the developing unit 43 is charged at a negative charge level by being agitated and, e.g., −600V is applied as a bias voltage, the toner adheres only to the part of the photoconductor drum 42 where LED light has been irradiated.

As a transfer sheet 44, a plurality of roll transfer sheets, each with a different width, are set such that an image of a long original document can be formed on a long transfer sheet with a desired width. A selected roll transfer sheet 44 is fed out by a corresponding feeding roller 45 and is cut to a desired length by a cutter 46. Then, the cut transfer sheet 44 is conveyed so as to pass under the photoconductor drum 42 at a predetermined timing. When the transfer sheet 44 passes under the photoconductor drum 42, a toner image on the photoconductor drum 42 is transferred onto the transfer sheet by a transfer charger 48. The transfer sheet 44 carrying the transferred toner image thereupon is separated from the photoconductor drum 42 by a separating charger 49 and is conveyed to a fixing unit 51 via a conveying part 50, where the toner image is fixed to the transfer sheet 44. The transfer sheet 44 carrying the fixed toner image is then output to an output tray 52.

Figure 5:
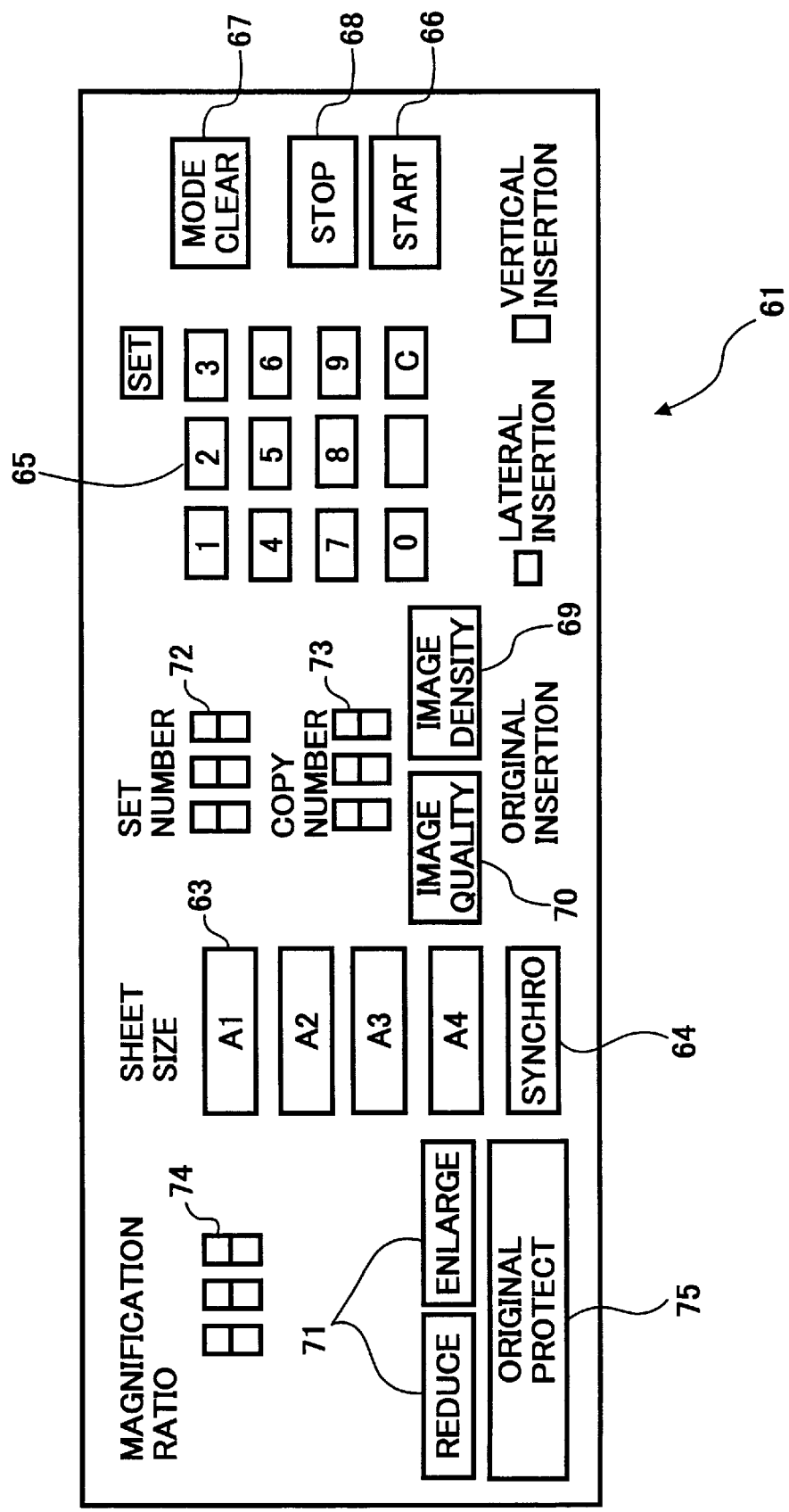
FIG. 5 is a plane view illustrating an exemplary structure of an operational panel of an operational device.

FIG. 5 is a schematic drawing illustrating an exemplary structure of the operational panel 61 of the operational device 6. As illustrated in FIG. 5, the operational panel 61 includes keys for designating various functions and modes, for example sheet size keys 63, a synchronizing key 64, ten keys 65, a start key 66, a mode-clearing key 67, a stop key 68, an image density adjusting key 69, an image quality adjusting key 70, and reduction/enlargement keys 71. Also, displays 72, 73, 74 are provided to display the number of original documents, the number of copies to be made, and the magnification ratio, respectively. In addition, an original document protect mode key 75 is provided as a device to set an original document protect mode.

The image reading device 2 according to the present invention is provided with a function of enlarging and reducing an image of an original document, which is read by the CCD 16, which is accomplished by omitting image information of the image or by mechanically changing the magnification ratio. The electrical omission of image information includes omission of image information for one line which is stored in a line memory with respect to the main scanning direction and omission of image information for an appropriate number of lines with respect to the sub-scanning direction. The image processing circuit 21 includes a sub-scanning magnification control circuit 81 that performs the omission operation for the sub-scanning direction.

Figure 6:
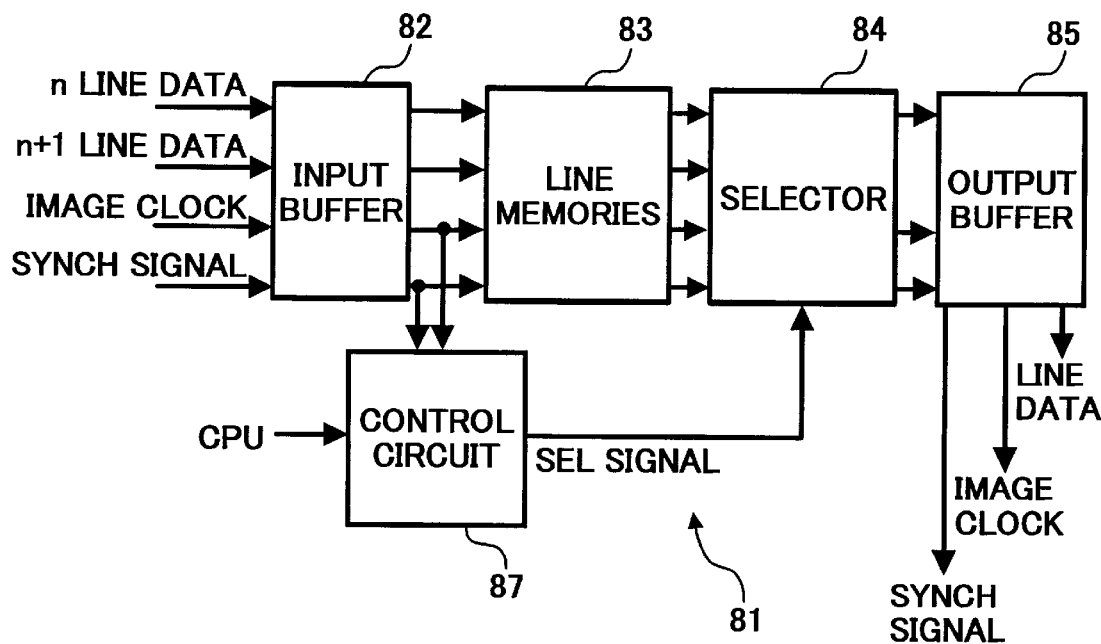
FIG. 6 is a diagram illustrating an exemplary construction of a sub-scanning magnification control circuit, which is provided in an image processing circuit of the original document reading device.

FIG. 6 is a diagram illustrating an exemplary construction of the sub-scanning magnification control circuit 81, which is provided in the image processing circuit 21 of the original document reading device 2. In addition to the control of the sub-scanning magnification, the image processing circuit 21 performs various image processes on the image data sent from the shading correcting circuit 20, for example MTF correction and smoothing, character or photo mode processing, editing, and image quality enhancing, and then outputs the processed image data to the image information storage device 3 so as to be stored in the image memory 22.

The sub-scanning magnification control circuit 81 first receives at an input buffer 82 image data of an "n" number of lines and an "n+1" number of lines, an image clock signal, and a synchronizing signal so that each wave form is corrected. The image data and so forth each with the corrected wave form are stored in a series of line memories 83 as a temporary line memory, each constructed as a FIFO (first-in-first-out) memory. Line data stored in the series of line memories 83 is output to the image memory 22 via an output buffer 85 by being selected by a selector 84. When a regular copying mode is designated, image information of each line read by the CCD 16 is output, line by line, according to the synchronizing signal, after having been processed by the image processing circuit 21 for amplification, analog-to-digital conversion, shading correction, and main scanning enlargement or reduction. On the other hand, when the original document protect mode is designated by the original document protect mode key 75, the instruction of the original document protect mode is sent to a control circuit 87 by a CPU (not shown) of the image reading control circuit 86. In response, the control circuit 87 sends a select signal to omit image information of every other line of the image information read by the CCD 16. The sub-scanning magnification control circuit 81 then controls to omit outputting image information of an (n+1)th line and outputs image information of an (n+2)th line after the information of an (n)th line of the image information read by the CCD 16.

Figure 7:
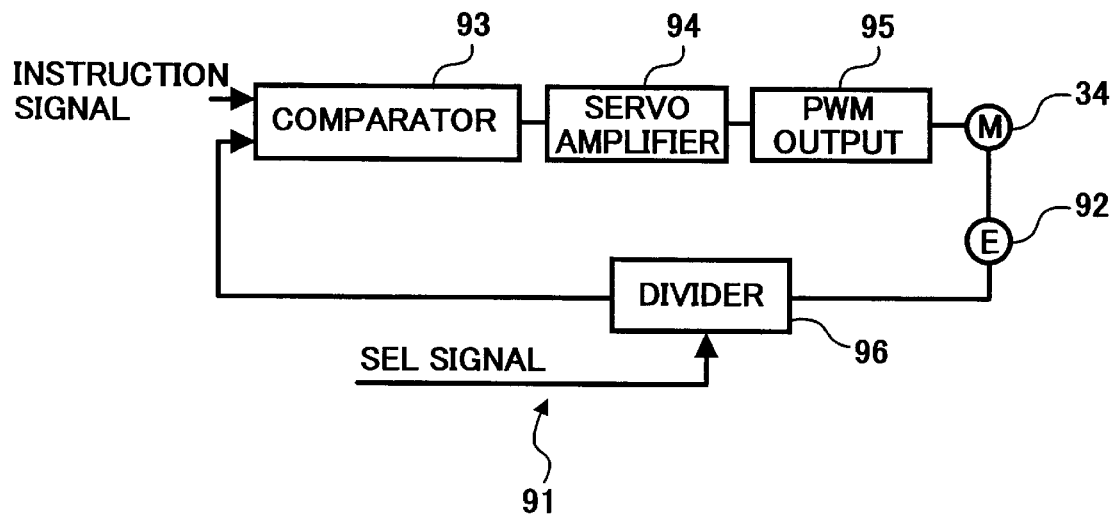
FIG. 7 is a diagram illustrating an exemplary construction of a control circuit controlling a drive motor, which performs a mechanical operation of changing the magnification for the sub-scanning direction.

FIG. 7 is a diagram illustrating an exemplary construction of a control circuit 91 controlling a drive motor 34, which performs a mechanical operation of changing the magnification for the sub-scanning direction. The drive motor 34 is controlled such that the rotation speed of the drive motor 34 becomes a target speed by feeding back the output of a rotary encoder 92 which is provided on the same axis as that of the drive motor 34. The control circuit 91 includes a comparing device 93 to obtain a difference between an instruction signal for a predetermined speed and a feed-back signal, and a proportional value and an integral value of the output value of the comparing device 93 are obtained by a servo amplifier 94. A driving pulse signal of the drive motor 34, which is modulated with respect to the pulse width by a PWM output circuit 95, is generated according to the proportional and integral values. The output of the rotary encoder 92 is sent back to the comparing device 93 via a frequency divider 96 in which the frequency dividing ratio is variable.

When an original document is set in the original document reading device 2 and the magnification ratio is set to a certain ratio with the scale of 1% in the range from 25% to 400% via the operation panel 61, the CPU of the image reading control circuit 86 outputs to the comparing device 93 an instruct signal to make the original document conveying speed correspond to the magnification ratio, i.e., the speed is inversely proportional to the set magnification ratio. The control circuit 91 then controls the drive motor 34 such that the rotation speed corresponds to the instruct signal. Thus, the original document is conveyed so as to be read at a predetermined speed corresponding to the designated magnification ratio.

When the original document protect mode is designated by the original document protect mode key 75, a select signal indicating the selection of the original document protect mode is sent to the frequency divider 96 by the CPU of the image reading control circuit 86 so that the frequency divider 96 output is changed, for example, by one half. Accordingly, the rotation speed of the drive motor 34 is also changed by one half. Thus, a part of the function of the original document protection is accomplished. For example, when the magnification ratio is 25%, an original document can be read in the original document protect mode while being conveyed at the same speed as that for the magnification ratio of 50%, that is, at a speed only twice faster than that for the magnification ratio of 100%. When the magnification ratio is 50%, an original document can be read while being conveyed at the same speed as that for the magnification ratio of 100%.

Thus, according to the present invention, when the normal enlarging and reducing mode is designated, the original document is conveyed at a speed corresponding to a designated magnification ratio and information of an image of the original document is omitted in the main scanning direction (but is not omitted in the sub-scanning direction), and thereby the image of the original document is formed on a transfer sheet 4 according to the obtained image information of the original document with the designated magnification. When the original document protect mode is designated by the original document protect mode key 75, on the other hand, the original document conveying speed is reduced, for example by one half of the predetermined speed for the designated magnification ratio, and at the same time information of the original document is omitted for every other line in the sub-scanning direction, and thereby an image according to the designated magnification ratio is obtained. Thus, even when forming a long original document reduced with a large magnification ratio, because the original document conveying speed can be reduced, for example, by one half by designating the original document protection mode, the original document can be conveyed in a safer conveying condition and can be prevented from being torn. Besides, omission of the information, for example for every other line in the sub-scanning direction, is a very simple electrical process and does not require such an electrical process as storing the information in a frame memory. Therefore, even when the original document is a long sheet and the length is unknown to the operator, an image of the long original document can be formed synchronized with feeding of the original document.

Numerous additional modifications and variations of the present invention are possible in light of the above teachings. It is therefore to be understood that within the scope of the appended claims, the present invention may be practiced otherwise than specifically described herein.

This document claims priority and contains subject matter related to Japanese patent application No. 10-165001 filed in the Japanese Patent Office on Jun. 12, 1998, the entire contents of which are hereby incorporated by reference.

What is claimed is:

1. A digital image forming apparatus, comprising:
   means for conveying an original document at a predetermined conveying speed according to a predetermined magnification ratio;
   means for reading image information of the original document;
   means for omitting information of the image information of the original document read by the original document reading means;
   means for forming an image according to the image information of the original document read by the original document reading means synchronized with conveying of the original document by the original document conveying means;
   means for designating an original document protect mode; and
   means for reducing the predetermined original document conveying speed of the original document conveying means by 1/n and causing the information omission means to omit information of every (n−1) number of lines of the image information read by the original document reading means in a sub-scanning direction when the original document protect mode is designated by the original document protect mode designating means, where n is an integer.

2. An image forming apparatus of claim 1, wherein n is 2.

3. An image forming apparatus of claim 1, wherein the digital image forming apparatus is a digital copier.

4. A digital image forming apparatus, comprising:
   means for designating an image magnification ratio;
   means for conveying an original document at a predetermined conveying speed according to the designated magnification ratio;
   means for reading image information of the original document;

means for omitting information of the image information of the original document read by the original document reading means;

means for forming an image according to the image information of the original document read by the original document reading means synchronized with conveying of the original document by the original document conveying means; and means for reducing the predetermined original document conveying speed of the original document conveying means by 1/n and causing the information omission means to omit information of every (n−1) number of lines of the image information read by the original document reading means in a sub-scanning direction when the image magnification ratio designated by the magnification ratio designating means for reducing the image exceeds a predetermined ratio, where n is an integer.

5. An image forming apparatus of claim 4, wherein n is 2.

6. An image forming apparatus of claim 4, wherein the digital image forming apparatus is a digital copier.

7. A digital image forming apparatus, comprising:

an original document conveying device configured to convey an original document at a predetermined conveying speed according to a predetermined magnification ratio;

an original document reading device configured to read image information of the original document with a one-dimensional image sensor;

an information omission device configured to omit information of the image information of the original document read by the original document reading device;

an image forming device configured to form an image according to the image information read by the original document reading device synchronized with conveying of the original document by the original document conveying device;

an original document protect mode designating device configured to designate an original document protect mode; and an original document protect mode processing device conveyed to reduce the predetermined conveying speed of the original document conveying device by 1/n and to cause the information omission device to omit information of every (n−1) number of lines of the image information read by the original document reading device in a sub-scanning direction when the original document protect mode is designated by the original document protect mode designating device, where n is an integer.

8. An image forming apparatus of claim 7, wherein n is 2.

9. An image forming apparatus of claim 7, wherein the digital image forming apparatus is a digital copier.

10. A digital image forming apparatus, comprising:

a magnification ratio designating device configured to designate an image magnification ratio;

an original document conveying device configured to convey an original document at a predetermined conveying speed according to the designated magnification ratio;

an original document reading device configured to read image information of the original document with a one-dimensional image sensor;

an information omission device configured to omit information of the image information of the original document read by the original document reading device;

an image forming device configured to form an image according to the image information read by the original document reading device synchronized with conveying of the original document by the original document conveying device;

an original document protect mode processing device configured to reduce the predetermined conveying speed of the original document conveying device by 1/n and to cause the information omission device to omit information of every (n−1) number of lines of the image information read by the original document reading device in a sub-scanning direction when the magnification ratio designated for reducing the image by the magnification ratio designation device exceeds a predetermined ratio, where n is an integer.

11. An image forming apparatus of claim 10, wherein n is 2.

12. An image forming apparatus of claim 10, wherein the digital image forming apparatus is a digital copier.

13. A method of forming an image in a digital image forming apparatus, comprising steps of:

conveying an original document at a predetermined conveying speed according to a magnification ratio;

reading image information of the original document with a one-dimensional image sensor;

forming an image according to the image information synchronized with conveying of the original document;

designating an original document protect mode; and reducing the predetermined original document conveying speed by 1/n and omitting information of every (n−1) number of lines of the image information read in the reading step in a sub-scanning direction when the original document protect mode is designated, where n is an integer.

14. A method of claim 13, wherein n is 2.

15. A method of claim 13, wherein the digital image forming apparatus is a digital copier.

16. A method of forming an image in a digital image forming apparatus, comprising steps of:

designating a magnification ratio for the image;

conveying an original document at a predetermined conveying speed according to the designated magnification ratio;

reading image information of the original document with a one-dimensional image sensor;

forming an image according to the image information synchronized with conveying of the original document;

reducing the predetermined original document conveying speed by 1/n and omitting information of every (n−1) number of lines of the image information read in the reading step in a sub-scanning direction when the magnification ratio for reducing the image designated in the magnification ratio designating step exceeds a predetermined ratio, where n is an integer.

17. A method of claim 16, wherein n is 2.

18. A method of claim 16, wherein the digital image forming apparatus is a digital copier.

* * * * *